Figure 1:
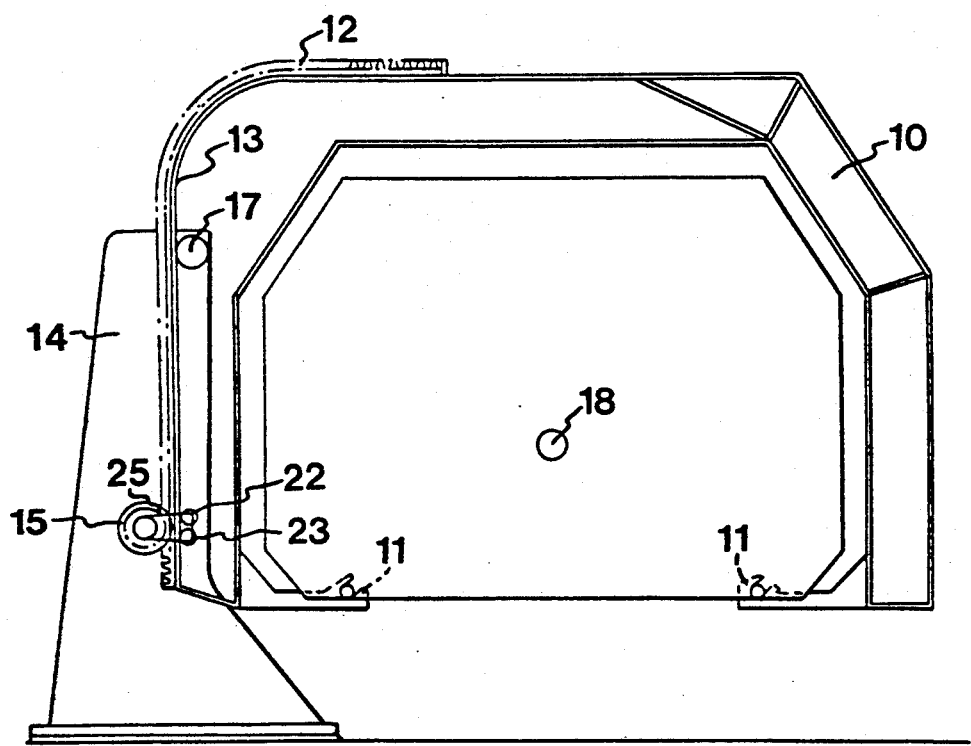

United States Patent [19]

Ahlsén et al.

[11] Patent Number: 5,076,753
[45] Date of Patent: Dec. 31, 1991

[54] LIFTING AND TURNING DEVICE FOR WORK OBJECTS, ESPECIALLY MOTOR VEHICLES

[75] Inventors: John B. B. Ahlsén, Angered; Kurt J. Dahlström, Partille; Bror H. I. Karlsson, Mölnlycke, all of Sweden

[73] Assignee: Internationell Fabriksautomation I Göteborg AB, Angered, Sweden

[21] Appl. No.: 572,547

[22] Filed: Aug. 27, 1990

[30] Foreign Application Priority Data

Sep. 6, 1989 [SE] Sweden .................... 8902941

[51] Int. Cl.⁵ .................................. B66F 7/22
[52] U.S. Cl. ........................... 414/678; 414/371; 414/766; 414/777; 414/778; 414/782
[58] Field of Search ............... 254/6 B, 6 C, 6 R; 414/359, 360, 364, 371, 372, 678, 681, 742, 766, 777, 778, 782

[56] References Cited

U.S. PATENT DOCUMENTS

| 814,098 | 3/1906 | Thompson | 414/742 X |
| 1,602,663 | 10/1926 | Hague | 414/371 |

FOREIGN PATENT DOCUMENTS

| 0140198 | 5/1985 | European Pat. Off. | |
| 3042152 | 6/1982 | Fed. Rep. of Germany | |
| 43277 | 4/1977 | Japan | 414/678 |

OTHER PUBLICATIONS

Derwent Publications Ltd., Abstract No. 87-055265/08, SU/1240 734.
Derwent Publications Ltd., Abstract No. B6320 K/05, SU 914 488.

Primary Examiner—Robert J. Spar
Assistant Examiner—Janice Krizek
Attorney, Agent, or Firm—Beveridge, DeGrandi & Weilacher

[57] ABSTRACT

A lifting and turning device for work objects comprises a stand (14) and a holding frame (10) which is supported thereby and in which the work object is fixable. The holding frame is connected in a vertically adjustable as well as turnable manner with the stand. Driving elements are provided for lifting, lowering and turning the holding frame. According to the invention, the holding frame (10) has parallel driving and idling wheel tracks (12, 13) which have curved corners and, connected thereto, straight portions extending substantially perpendicular to one another. Furthermore, the device has a driving wheel (15) and an idling wheel (17), respectively, engaging the tracks (12, 13) and being provided at a distance from one another as seen in the direction of the tracks, one on the inside and the other on the outside of the parallel tracks. The wheel (17) on the inside is disposed on a higher level than the wheel (15) on the outside. The driving arrangement for lifting, lowering and turning the holding frame comprises a driving motor which is connected to the driving wheel for transmitting driving force thereto.

10 Claims, 5 Drawing Sheets

LIFTING AND TURNING DEVICE FOR WORK OBJECTS, ESPECIALLY MOTOR VEHICLES

The present invention relates to a lifting and turning device for work objects, said device comprising a stand, a holding frame which is supported thereby and in which the work object is fixable, said frame being connected in a vertically adjustable as well as turnable manner with said stand, and driving elements for lifting, lowering and turning the holding frame.

Lifting and turning devices are used in the assembly industry, e.g. when assembling passenger cars, to increase accessibility and make it possible to work from the side instead of from below. Thus, the assembler need not work with his hands over his head. Also in garages, there is a need of raising, lowering and turning the cars through 90° or 180° to the left or to the right, as well as raising and lowering them in these different positions. This is also the case when assembling and servicing other work objects, such as engines and other workpieces.

Today's installations for handling such work objects usually comprise pillar-type lifts and separate turning devices. Admittedly, combined lifting and turning devices have been proposed, but they have all been complicated as well as expensive. Furthermore, different driving machinery has been needed for the lifting movement and the turning movement. Examples of known devices of these kinds Derwent's abstracts Nos. 87-055265/08 (SU 1,240,734 A) and B6320 K/05 (SU 914,488).

The object of the present invention is to provide a device of the type stated in the introduction to this specification, in which one single driving element achieves both the lifting and the turning movements. Another object of the invention is to make it possible to raise and lower the work object both when said object is in a horizontal position and when it is turned through 90 or 180°.

According to the invention, these and other objects are achieved by the device of the main claim. The subclaims state especially preferred embodiments of the invention.

Figure 2:
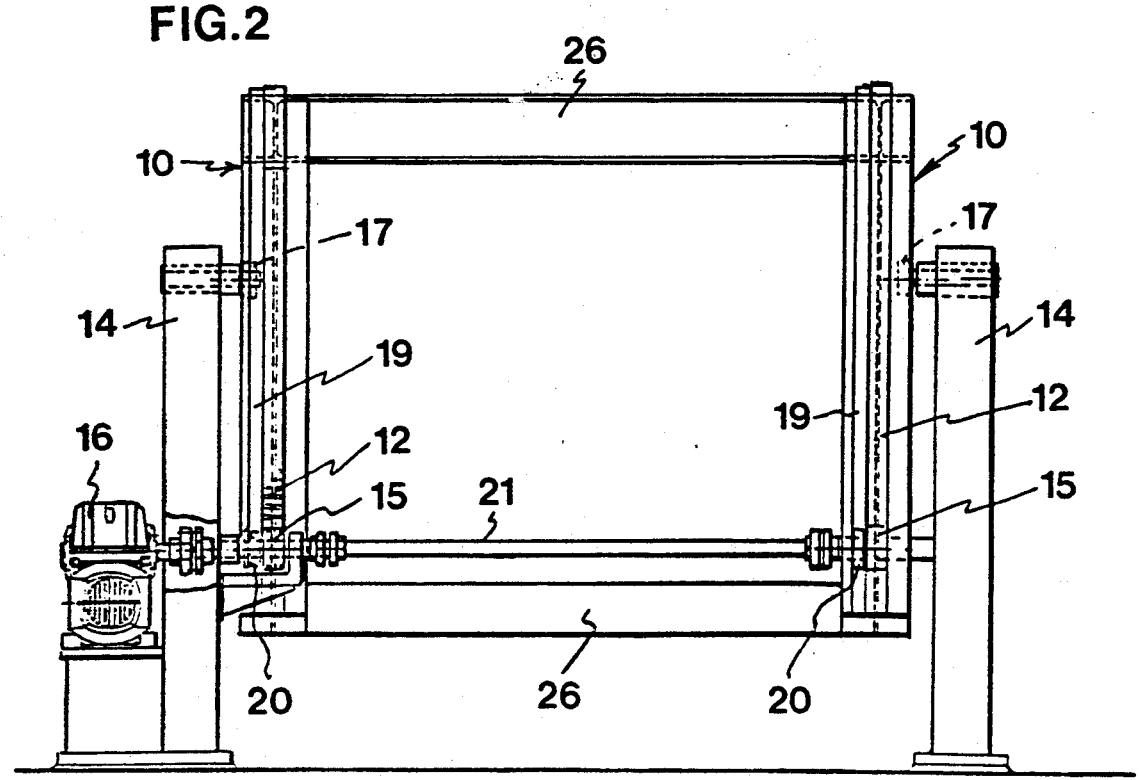
Figure 3:
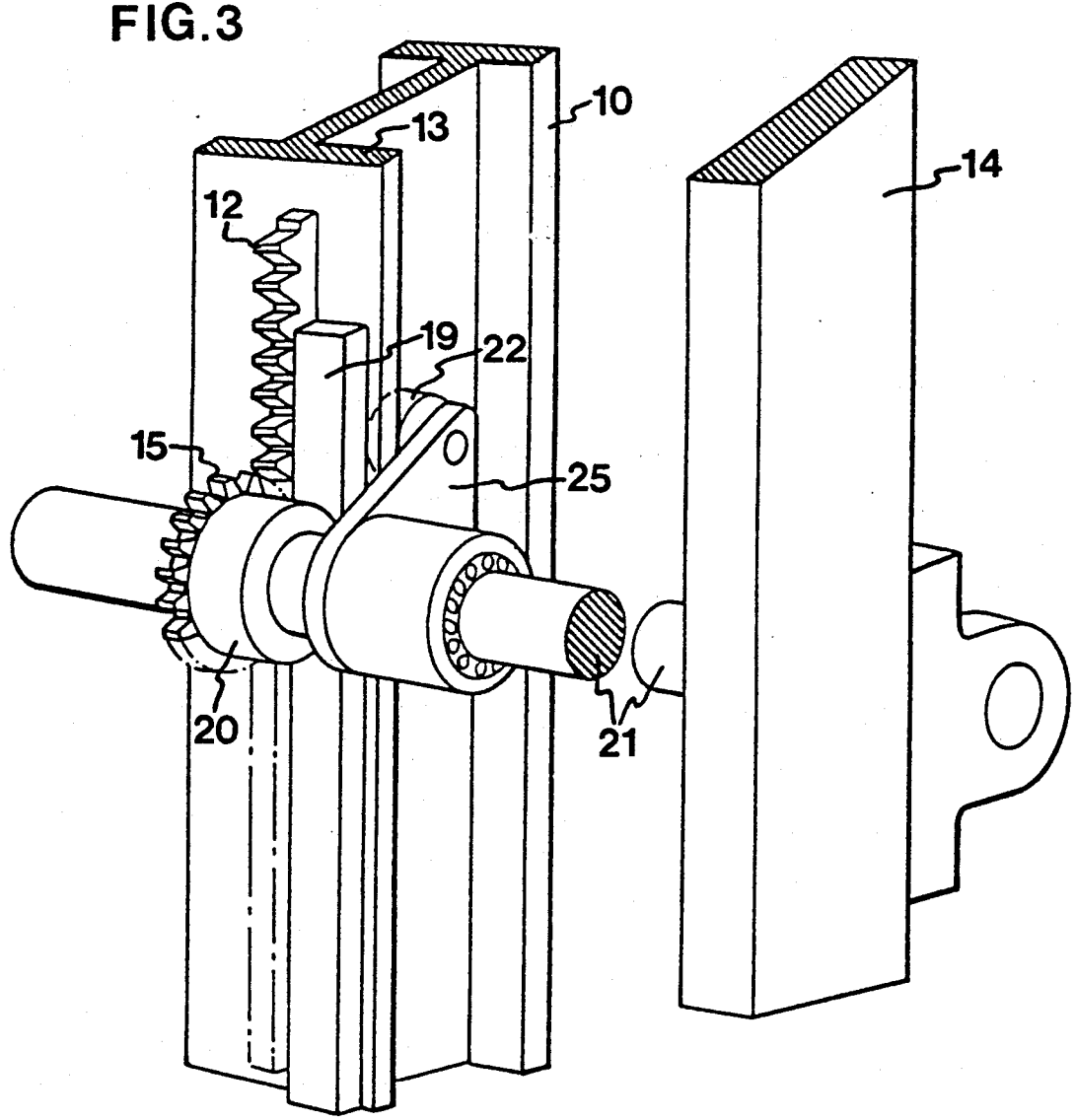
Figure 4:
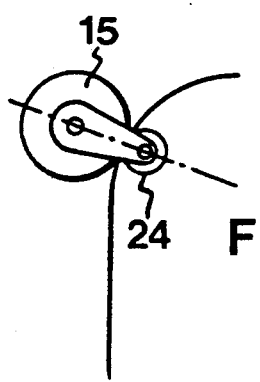
Figure 5:
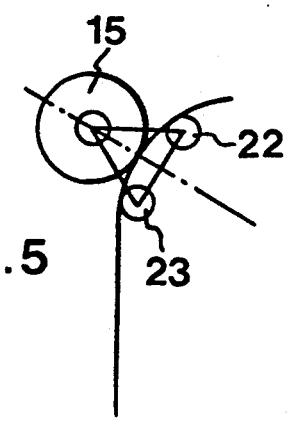
Figure 6:
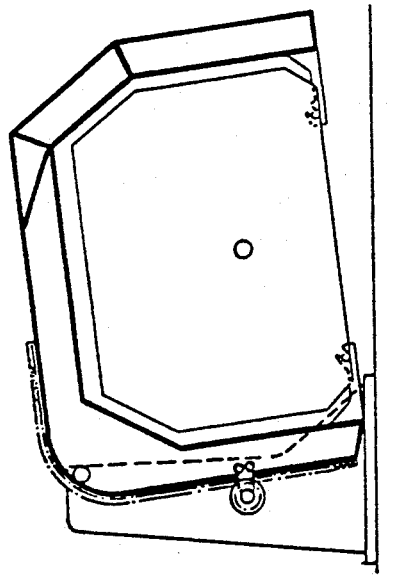
Figure 7:
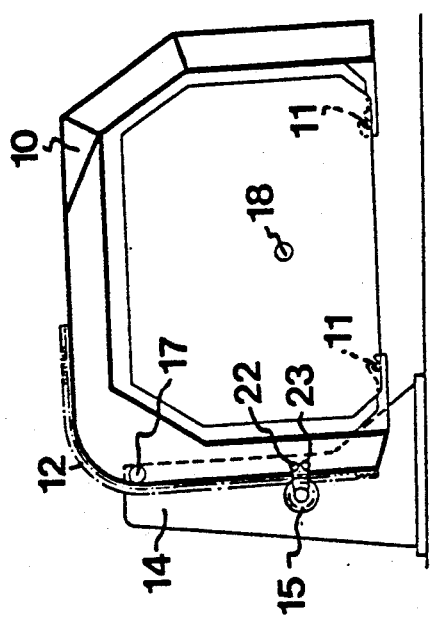
Figure 9:
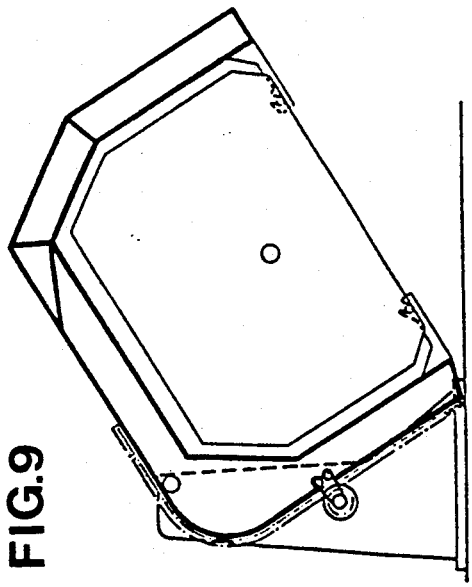
Figure 8:
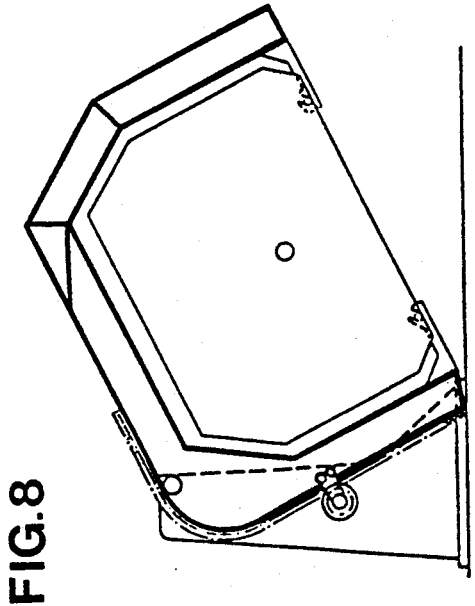
Figure 11:
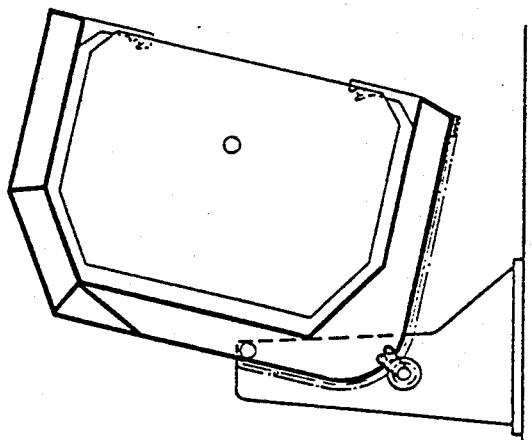
Figure 13:
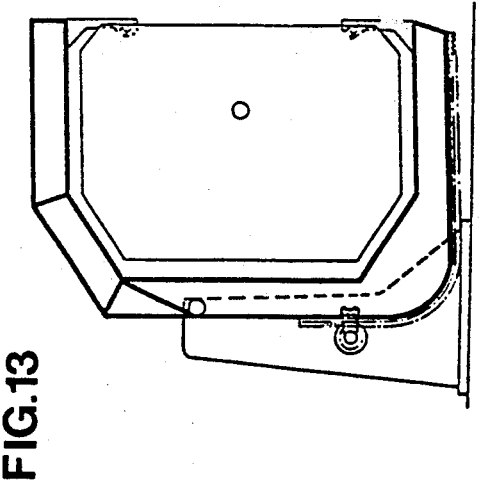
Figure 10:
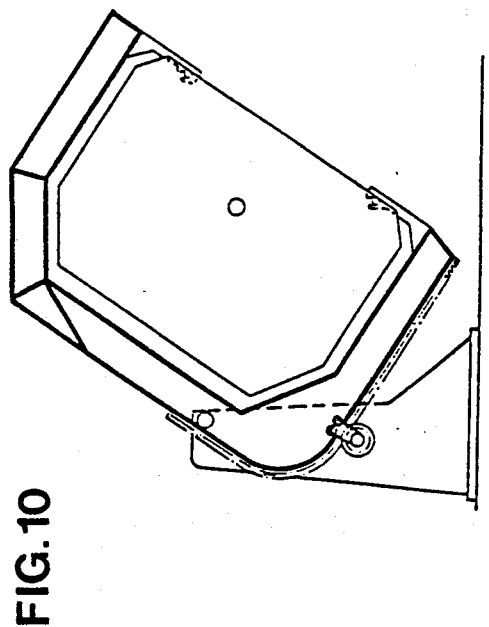
Figure 12:
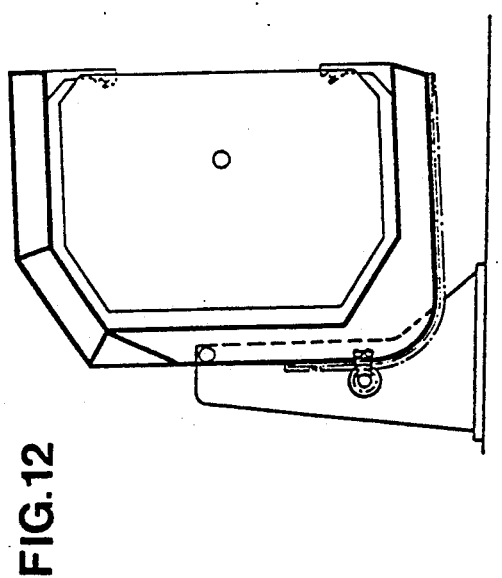
Figure 14:
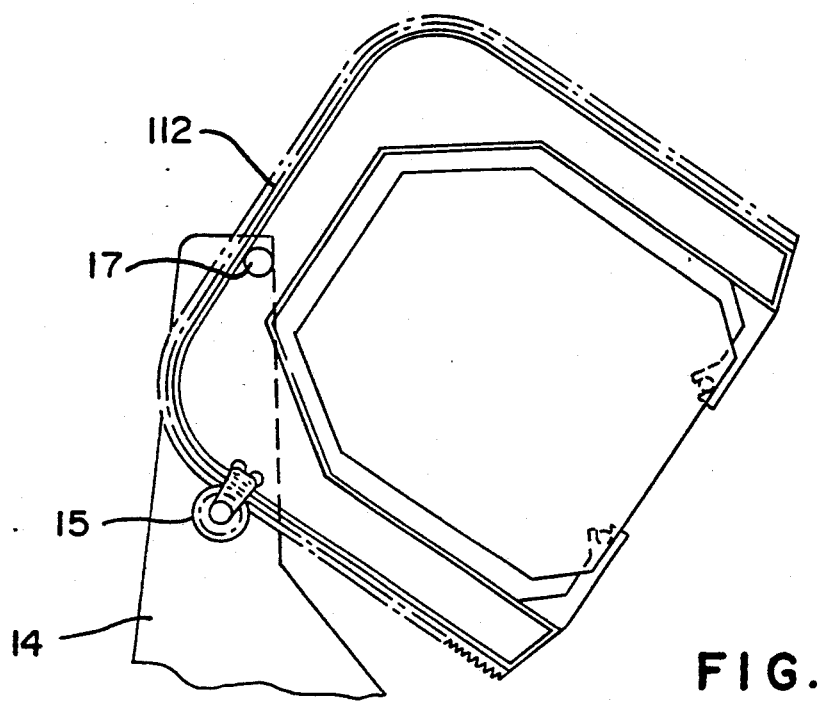
Figure 15:
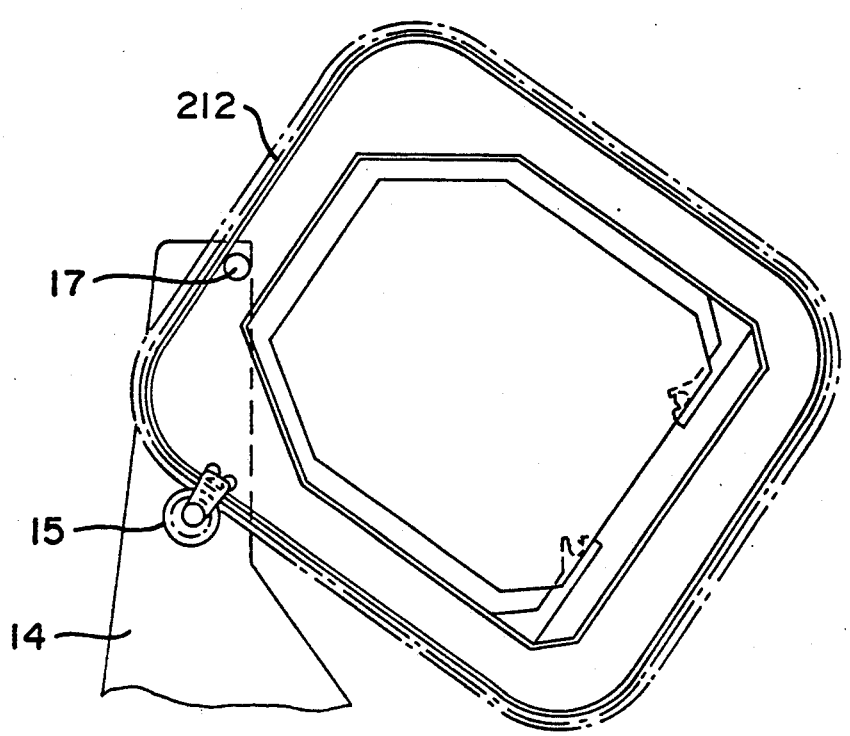

The invention will be described in more detail below, reference being had to the accompanying drawings, in which FIG. 1 is an end view of a device according to the invention, the components being in neutral position, FIG. 2 is a view of the device according to the invention as seen from the left in FIG. 1, FIG. 3 is a schematic perspective view illustrating a component of the device according to the invention, FIGS. 4 and 5 are schematic views illustrating two alternative component parts of the device according to the invention, FIGS. 6-13 show the device according to the invention in a series of different setting positions illustrating the lifting and turning movements, and FIG. 14 shows an embodiment of the device having a U-shaped track, and FIG. 15 shows an embodiment of the device having a square track.

The embodiment shown in the drawings comprises a holding frame 10 with fasteners 11 for the work object. At least when large objects are being handled, it is preferred that the holding frame is U-shaped. If the work object is a motor vehicle, the fasteners 11 may suitably be adapted to the jack fasteners of the vehicle to evenly distribute the weight amongst the different parts of the car. In the embodiment shown, the holding frame 10 is made of I-beams and has an L-shaped driving wheel track 12 in the form of a gear rack which is arranged on the outside of the holding frame and comprises two substantially straight portions essentially perpendicular to one another, and a curved portion connecting the straight portions with each other. The holding frame also has an idling wheel track 13 running parallel to the gear rack 12 and facing the interior of the frame 10, i.e. running on the same side of the frame as where the center of gravity of said frame is located, both in loaded and in unloaded condition. In this case, the idling wheel track 13 consists of one flange of the I-beam. A stand 14 has a driving gear 15 which is mounted on a stationary shaft 21 and connected to a driving motor 16. The stand also has an idling wheel 17. The holding frame 10 is supported by the stand 14 in that the driving gear 15 engages the gear rack 12 and the idling wheel track 13 is supported by the idling wheel 17. The idling wheel 17 and the driving gear 15 are spaced apart, as seen in the longitudinal direction of the gear rack 12 and the idling wheel track 13, respectively, to provide sufficient leverage to take up the torque caused by the load of the work object. The centers of gravity of the holding frame 10 and the work object may be located approximately at the center-of-gravity mark 18. Since the centers of gravity of the holding frame 10 and the frame loaded by the work object are at all times located at a distance from the stand 14 and on the same side thereof, an engagement pressure between the gear rack 12 and the driving gear 15 as well as between the idling wheel track 13 and the idling wheel 17 is maintained at all times. When the driving gear 15 is rotated, it will run along the gear rack 12 and the frame can be set in different positions as shown in FIGS. 1 and 6-13. The upper wheel, i.e. the support wheel 17 in the embodiment shown, thus is located on the same side of the holding frame as the center of gravity 18, so that it takes up torque from the frame and the work object.

When heavy work objects are handled, it may be necessary to reduce the engagement pressure between the driving gear and the gear rack. In an especially preferred embodiment of the invention, a support wheel track 19 is therefore provided on the same side of the frame 10 as the gear rack 12. The support wheel track 19 is disposed on a level with the pitch line of the gear rack. A backing-up or cam roller 20, whose diameter corresponds to the pitch diameter of the driving gear 15, is provided on the shaft 21 of the driving gear and idles against the support wheel track 19. In this manner, the backing-up or cam roller 20 will take up the pressure generated by the weight of the holding frame 10 and the work object. In an embodiment not shown in the drawings, the support wheel track may be located on another level than the pitch line of the gear rack and may, for instance, consist of the surface of the frame 10. In this case, the support wheel is an idling wheel. Also in the embodiment shown, the support wheel may be freely rotatable relative to the driving wheel or driving gear 15.

In some cases, the design of the cogs may entail a tendency of the driving gear 15 to take off from the gear rack 12, thus making the holding frame come loose from the stand. To counteract this tendency, one or two retaining rollers 22, 23, 24 are used in an especially preferred embodiment of the invention. In the embodiment illustrated in FIGS. 1–3 and 5, there are two retaining rollers 22, 23, while the embodiment in FIG. 4 has one retaining roller 24. The retaining rollers are arranged on the same side as the idling wheel 17 and idle against the same idling track 13. Furthermore, the idling rollers are connected to the shaft 21 of the driving gear 15 by means of an arm 25 which is mounted in bearings so as to be freely rotatable about the driving shaft 21. Thus, a reliable engagement between the driving gear 15 and the gear rack 12 is maintained by the use of one or more retaining rollers.

In the embodiment shown, the driving gear 15 serves as driving wheel, while the gear rack 12 is used as driving wheel track. Although a driving gear and a gear rack are preferred, other driving wheels and driving wheel tracks can be used within the scope of the invention. Thus, the driving wheel may consist of a driven wheel whose tread consists of or is covered with a friction material, e.g. rubber. In this case, the driving wheel track may consist of or be covered with a material having a high friction coefficient compared with that of the material forming the driving wheel tread.

As is apparent from the Figures, the holding frame 10 cantilevers from the driving and idling wheels on the stand 14. This is highly advantageous, since the work object thus becomes more easily accessible than if there had been a stand on both sides of the holding frame 10.

As is apparent from FIG. 3, the load-bearing beams of the holding frame 10 are I-beams, the inside of one flange of said beams serving as the idling wheel track 13. In the other embodiments of the device according to the invention mentioned above, the driving wheel track 12 as well as the support wheel track 19 may consist of the outwardfacing side of the flange of the I-beam. It is preferred that this flange surface is given a suitable surface structure or is covered with a suitable friction material for obtaining the requisite friction coefficient against the material forming the tread of the driving wheel 15.

In the embodiment shown, the device comprises two successive stand columns and holding frames, one drive motor 16 and one driving shaft 21 being used for both devices. In this case, the two holding frames 10 are mechanically connected with one another by means of transverse beams 26. If need be, more than two holding frames can be used, but, for some types of work objects, one holding frame may be sufficient.

In the embodiment shown, the driving wheel track or gear rack 12 and the idling wheel track 13 are L-shaped and have rounded corners. In other embodiments shown, they may instead be U-shaped, as shown at 112 in FIG. 14. In yet another embodiment shown in FIG. 15, the holding frame as well as the driving wheel track 212 and idling wheel track may be rectangular, e.g. square, and have rounded corners. This renders possible a complete turning of the work object to all turning positions, as well as a raising and a lowering of said object in those positions in which the rectilinear portions of the driving wheel and idling wheel tracks extend substantially vertically between the idling and driving wheels 17 and 15, respectively.

Thus, the present invention makes it possible to avoid, in assembly work, unfavourable working positions and ensuing joint injuries, owing to the increased accessibility of the work object which can be optionally raised and lowered as well as turned. The device according to the invention gives fre. and unhindered access to at least one side of the work object, and the assemblers thus can get at the work object from an unobstructed floor. A supporting column or stand is only required on one side of the device according to the invention. Also, the function is simple, and the center of gravity of the work object or the object to be assembled is maintained within a welldefined limited area during turning as well as raising and lowering movements. This means a great reduction of energy during these movements. With the device according to the invention, it is possible to drive or roll a motor vehicle on the floor into the device and then to lift and turn the vehicle to the desired position. During the tilting and lifting/lowering movements, the motor vehicle can be held in its jack fasteners, the weight being evenly distributed between the left and the right side of the car, partly because of the holding frames of the device and partly because of the insignificant shifting of the center of gravity in the different turning positions.

We claim:

1. A lifting and turning device for work objects, comprising a stand (14), a holding frame (10) which is supported thereby and in which the work object is fixable, said frame being connected in a vertically adjustable as well as turnable manner with said stand, and driving elements for lifting, lowering and turning the holding frame, characterised in that the holding frame has parallel driving and idling wheel tracks (12, 13) which have curved corners and straight portions which are connected to the curved corners, the straight portions extending substantially perpendicular to each other, one of said tracks having an inside facing toward said holding frame and the other of said tracks having an outside facing away from said holding frame, a driving wheel (15) and an idling wheel (17) respectively engaging said driving and idling wheel tracks and being spaced a distance from one another lengthwise along the tracks, one of the wheels engaging the inside and the other of the wheels engaging the outside of said parallel tracks (12, 13), the wheel engaging the inside being disposed at a higher level than that engaging the outside, and that the driving elements for lifting, lowering and turning the holding frame comprises a driving motor (16) connected to the driving wheel (15) for transmitting driving force thereto.

2. Device as claimed in claim 1, characterised in that the driving wheel is a driving gear (15), and that the driving wheel track is a gear rack (12).

3. Device as claimed in claim 2, characterised in that a support wheel track (19) is provided beside the gear rack (12) on the same side of the U-shaped holding frame (10) as said gear rack, and that a backing-up roller (20) is provided on the stand (14) for idling along the support wheel track (19) so as to relieve gear engagement pressure.

4. Device as claimed in claim 3, characterised in that the support wheel track (19) is arranged on a level with the pitch line of the gear rack (12).

5. Device as claimed in claim 3 or 4, characterised in that the backing-up roller (20) is an idling roller.

6. Device as claimed in any one of claims 1 to 4, characterised in that the driving wheel (15) is connected with a retaining roller (22, 23, 24) adapted to idle along the idling wheel track (13) for maintaining the driving engagement between the driving wheel (15) and the driving wheel track (12).

7. Device as claimed in claim 6, characterised in that the driving wheel (15) is connected with two adjacent retaining rollers (22, 23) adapted to idle along the idling wheel track (13).

8. Device as claimed in any one of claims 1 to 4, characterised in that the driving and idling wheel tracks (12, 13) are L-shaped, U-shaped or rectangular, and have rounded, curved corners.

9. Device as claimed in any one of claims 1 to 4, characterised in that the driving wheel (15) is provided on the outside of the holding frame (10) and on a lower level than the idling wheel (17).

10. Device as claimed in any one of claims 1 to 4, characterised in that it has two mutually adjacent, spaced-apart holding frames (10), the driving motor (16) being connected to the driving wheels (15) of said frames for transmitting driving force thereto.

* * * * *